(12) United States Patent
Miyagawa et al.

(10) Patent No.: US 7,225,679 B2
(45) Date of Patent: Jun. 5, 2007

(54) PRESSURE SENSOR

(75) Inventors: Haruhiko Miyagawa, Chiryu (JP); Teruo Oda, Gamagori (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/313,927

(22) Filed: Dec. 22, 2005

(65) Prior Publication Data
US 2006/0090569 A1 May 4, 2006

Related U.S. Application Data

(63) Continuation of application No. PCT/JP2005/005493, filed on Mar. 25, 2005.

(30) Foreign Application Priority Data

Mar. 30, 2004 (JP) ............................. 2004-099800
Sep. 30, 2004 (JP) ............................. 2004-287268

(51) Int. Cl.
*G01L 7/08* (2006.01)
(52) U.S. Cl. .......................................... 73/753; 73/756
(58) Field of Classification Search ................. 73/756, 73/753, 715; 361/283.4
See application file for complete search history.

(56) References Cited

U.S. PATENT DOCUMENTS

| 6,212,955 | B1 | 4/2001 | Tanaka et al. |
| 6,810,746 | B2 | 11/2004 | Naegele et al. |
| 2005/0199028 | A1* | 9/2005 | Shin ................................ 71/8 |
| 2005/0199068 | A1* | 9/2005 | Yoshino ...................... 73/715 |
| 2005/0252299 | A1* | 11/2005 | Oda ............................. 73/715 |
| 2005/0274189 | A1* | 12/2005 | Oda et al. ..................... 73/702 |
| 2006/0090566 | A1* | 5/2006 | Oda ............................. 73/715 |
| 2006/0162141 | A1* | 7/2006 | Takeuchi ................. 29/407.07 |

FOREIGN PATENT DOCUMENTS

JP B2-2504737 4/1996

* cited by examiner

*Primary Examiner*—Andre J. Allen
(74) *Attorney, Agent, or Firm*—Posz Law Group, PLC

(57) ABSTRACT

Two sides of a single metal plate are bent to form the structure of a spring terminal having two spring portions. In the spring terminal having such a structure, the two spring portions are different from each other in a natural frequency. For this reason, when external vibrations are applied to a pressure sensor, even if one of the two spring portions of the spring terminal resonates with the external vibrations, the other spring portion can keep the electric connection between a circuit in a substrate and a terminal.

20 Claims, 8 Drawing Sheets

180
PRESSURE SENSOR

CROSS REFERENCE TO RELATED APPLICATION

This application is a continuation of an international patent application No. PCT/JP2005/005493 filed Mar. 25, 2005 designating the United States of America, and is based on Japanese Patent Applications No. 2004-99800 filed on Mar. 30, 2004, and No. 2004-287268 filed on Sep. 30, 2004, the contents of which are incorporated herein by reference in its entirety.

FIELD OF THE INVENTION

The present invention relates to a pressure sensor improved in resistance to vibrations applied thereto from an outside.

BACKGROUND OF THE INVENTION

Figure 8:
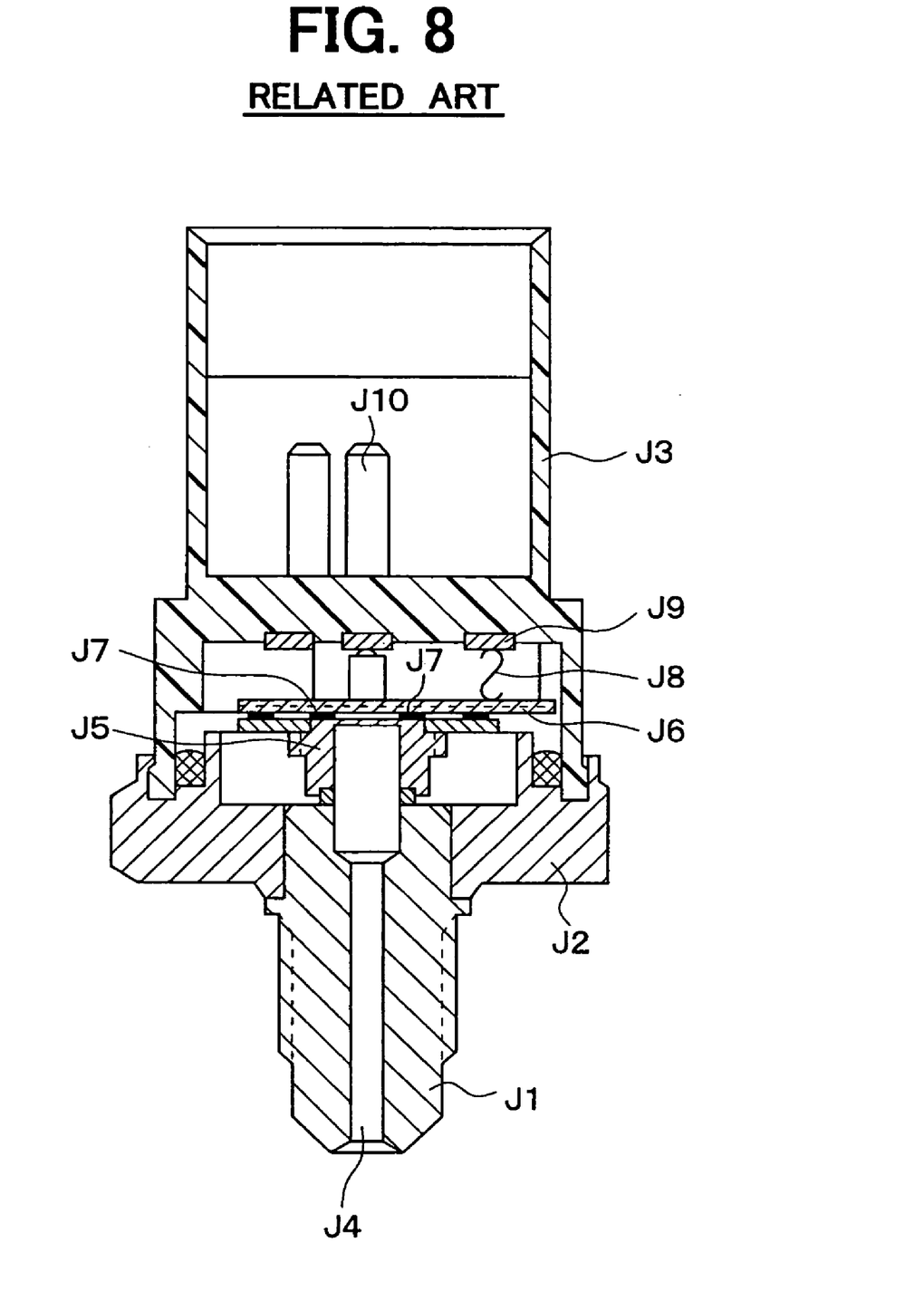
FIG. 8 is a schematic sectional view of a pressure sensor in a related art.

Structures capable of realizing a small-sized pressure sensor by simplifying the internal structure of the pressure sensor have been proposed (for example, International Patent Application Publication No. JP 2003-529070 which corresponds to U.S. Pat. No. 6,810,746) FIG. 8 is a schematic sectional view showing a pressure sensor in a related art. As shown in FIG. 8, the pressure sensor is so constructed as to include a housing J1, a hexagonal casing J2, and a device connector J3.

The housing J1 is fixed to the hexagonal casing J2 in such a way as to pass through it. A pressure introducing port J4 is provided in one end of this housing J1 and a pressure measuring cell J5 provided with a diaphragm is arranged at the terminal portion of this pressure introducing port J4. This pressure measuring cell J5 is electrically connected, via the contact surface J7 of a substrate J6 having an integrated circuit, to the integrated circuit in the substrate J6. Further, the integrated circuit in the substrate J6 is electrically connected via a compression spring (plate spring formed in the shape of a letter S) J8 to a connector contact J9 placed in the device connector J3. Still further, the connector contact J9 is electrically connected to a terminal J10.

The device connector J3 is fixed to the hexagonal casing J2 in such a way as to cover the pressure measuring cell J5, the substrate J6, and the compression spring J8 to construct a package. Here, the device connector J3 has an external connector (not shown), thereby being electrically connected to an external device.

In the construction described above, the integrated circuit in the substrate J6 is electrically connected to the connector contact J9 by the compression spring J8 formed in the shape of a letter S. Specifically, one end of the compression spring J8 is directly connected to the substrate J6 by a conductive adhesive. On the other hand, the other end of the compression spring J8 is adapted to be put into contact with the connector contact J9 placed in the device connector J3 when the device connector J3 is fitted into the hexagonal casing J2. In this manner, the state of electrical conduction between the integrated circuit in the substrate J6 and the connector contact J9 is set.

However, in the above-described conventional structure having the state of electrical conduction by the compression spring J8, there is presented a problem that when the pressure sensor suffers external vibrations, the compression spring J8 resonates with the external vibrations. Here, one end of the compression spring J8 is directly connected to the substrate J6 but the other end of the compression spring J8 is only pressed onto and fixed to the connector contact J9. Hence, there is a possibility that when the compression spring J8 suffers and resonates with the external vibrations, the other end of the compression spring J8 might be brought to a state in which it is separated from, that is, it is not in contact with the connector contact J9. When such a state is formed, the substrate J6 is electrically separated from the connector contact J9. Hence, the signal of a sensed pressure value cannot be taken out to the outside.

Moreover, when the compression spring J8 resonates, in some cases, the compression spring J8 in contact with the connector contact J9 vibrates in such a way as to rub the connector contact J9. In this manner, when the other end of the compression spring J8 vibrates, the compression spring J8 and the connector contact J9 are worn. This causes malfunctions that the output from the substrate J6 becomes unstable and that a signal showing a pressure value includes noises.

The above problems easily occur, in particular, when the pressure sensor is mounted in a place where the pressure sensor is susceptible to vibrations (for example, in the engine room of a vehicle).

SUMMARY OF THE INVENTION

In view of the above-described problems, it is an object of the present invention to provide a pressure sensor capable of outputting a signal with reliability even when the pressure sensor has vibrations applied thereto from an outside.

According to a first example of the present invention, a pressure sensor includes: a housing having a pressure introducing hole; a stem having a hollow cylindrical shape, which has a diaphragm part deformable by pressure introduced into the housing, at one end in an axis of the hollow cylindrical shape, and has a passage communicating with the pressure introducing hole at another end of the axis; a sensing part that is provided on the diaphragm part and outputs an electric signal responsive to a deformation of the diaphragm part; a substrate that receives the electric signal and makes an output signal responsive to the electric signal; a spring terminal that has a plurality of spring portions which are different from each other in a natural frequency. In the pressure sensor, one end portions of the spring portions can be bonded to the substrate, and other end portions of the spring portions can abut a terminal which outputs the output signal to an outside.

As described above, the electric connection between the substrate and the terminal is performed via the spring terminal having the spring portions which are different from each other in the natural frequency. Accordingly, when the pressure sensor receives external vibrations, even if one of the spring portions resonates with the external vibrations, another spring portion can be prevented from resonating with the external vibrations. Therefore, the circuit in the substrate can be always electrically connected to the terminal. In this manner, it is possible to enhance the resistance to vibration of the pressure sensor and for the pressure sensor to output a signal with stability.

Moreover, the spring terminal is in a state where one end portions of the respective spring portions are directly bonded to the substrate. That is, even when the pressure sensor undergoes external vibrations, the spring portions are prevented from being shifted to the surface of the substrate. Even if the other end portions of the respective spring portions resonate and vibrate, the other end portions of the respective spring portion resonate with external vibrations of different frequencies and hence rub the terminal in different states. Thus, the respective spring portions and the terminal are different in the progress of wear and the progress of wear has redundancy. Therefore, it is possible to reduce wear in the respective spring portions and the terminal.

According to a second example of the present invention, a pressure sensor includes a housing having a pressure introducing hole, a stem having a hollow cylindrical, which has a diaphragm part deformable by pressure introduced into the housing at one end in an axis of the hollow cylindrical shape, and has a passage communicating with the pressure introducing hole formed at the other end of the axis; a sensing part that is provided on the diaphragm part and outputs an electric signal responsive to a deformation of the diaphragm part; a substrate that receives the electric signal and makes an output signal responsive to the electric signal; a spring terminal that has a plurality of spring portions which are different from each other in a natural frequency; and a terminal which outputs the output signal to an outside. In the pressure sensor, one end portions of the spring portions are bonded to the terminal, and the other end portions of the spring portions abut against electrodes provided on the substrate.

Even if the external vibrations are applied to the pressure sensor, because the spring terminal has the plurality of spring portions which are different from each other in the natural frequency, only one of the spring portions undergoes the effect of resonance and the circuit in the substrate can be always electrically connected to the terminal by the other spring portion that does not undergo the effect of resonance. Therefore, even when the pressure sensor undergoes vibrations from the outside, it can always output a signal.

Moreover, since the one end portions of the respective spring portions are fixed, even when the pressure sensor undergoes external vibrations, the other end portions of the respective spring portions resonate with external vibrations of different frequencies and hence rub the substrate in different states. Therefore, the respective spring portions and the substrate are different in the progress of wear and the progress of wear has redundancy. Therefore, it is possible to reduce wear in the respective spring portions and the substrate.

The pressure sensor can be further provided with a connector case bonded to the housing at a position opposite to a surface on which the stem is arranged in the housing. In addition, the substrate is provided with the electrodes against which the other end portions of the spring portions abut, and each of the electrodes is formed in a fan shape extending in a circumferential direction of a circle (E) having a center at a central axis of connecting the housing to the connector case and having an arbitrary radius.

Since the electrodes are formed in the fan shape, respectively, even when the connector case rotates around the central axis of connecting, the electrode is so shaped as to be along the direction of rotation. Hence, this can enlarge the degree of allowance for connecting until the other end portion of the spring portion of the spring terminal bonded to the terminal goes out of the electrode. Therefore, it is possible to enhance the resistance to external vibrations of the pressure sensor and to prevent a reduction in the yield of the pressure sensor and to improve the reliability of the pressure sensor because the other end portion of the spring portion does not go out of the electrode when the housing is connected to the connector case.

A third example of the present invention, a pressure sensor includes: a housing having a pressure introducing hole; a stem having a hollow cylindrical shape, which has a diaphragm part deformable by a pressure introduced into the housing at one end in an axial of the hollow cylindrical shape and has a passage communicating with the pressure introducing hole at the other end of the axis; a sensing part that is provided on the diaphragm part and outputs an electric signal responsive to a deformation of the diaphragm part; a substrate that receives the electric signal and makes an output signal responsive to the electric signal; a spring terminal that has a plurality of spring portions which are equal to each other in a natural frequency, wherein one end portions of the spring portions are bonded to the substrate; and a terminal against which other end portions of the spring portions abut and which outputs the output signal to an outside. In addition, the spring portions of the spring terminal are different from each other in a bent shape of the spring portion.

To make the electric connection between the substrate and the terminal, the spring terminal having the spring portions which are equal to each other in the natural frequency characteristic is placed between the substrate and the terminal in such a way that the respective spring portions are different from each other in the bent shape. With this, the respective spring portions can be made different from each other in the resonance frequency. Therefore, even when the pressure sensor undergoes external vibrations and one of the respective spring portions resonates with the external vibrations, the other spring portion does not resonate with the external vibrations, so that the electric connection between the substrate and the terminal can be always kept. In this manner, it is possible to enhance the resistance to vibration of the pressure sensor and hence for the pressure sensor to output a signal with reliability.

Moreover, since one end portions of the respective spring portions are fixed to the substrate, even when the pressure sensor undergoes external vibrations, the other end portions of the respective spring portions resonate with external vibrations of different frequencies, so that the other end portions of the spring portions are different from each other in the state of rubbing the substrate. Therefore, the respective spring portions and the substrate are different from each other in the progress of wear and the progress of wear has redundancy. Accordingly, it is possible to reduce wear in the respective spring portions and the substrate.

According to a fourth example of the invention, a pressure sensor includes: a housing having a pressure introducing hole; a stem having a hollow cylindrical shape, which has a diaphragm part deformable by pressure introduced into the housing at one end in an axis of the hollow cylindrical shape and has a passage communicating with the pressure introducing hole formed at the other end of the axis; a sensing part that is provided on the diaphragm part and outputs an electric signal responsive to a deformation of the diaphragm part; a substrate that receives the electric signal and makes an output signal responsive to the electric signal; a spring terminal that has a plurality of spring portions which are equal to each other in a natural frequency; and a terminal which outputs the output signal to an outside. Here, one end portions of the spring portions are bonded to the terminal and other end portions of the spring portions abut against electrodes provided on the substrate. Furthermore, the spring portions of the spring terminal are different from each other in a bent shape of the spring portion.

To make the electric connection between the substrate and the terminal, the spring terminal having the spring portions which are equal to each other in the natural frequency characteristic is placed between the substrate and the terminal in such a way that the respective spring portions are different from each other in the bent shape. With this, the respective spring portions can be made different from each other in the resonance frequency. Hence, even when external vibrations are applied to the pressure sensor, only one of the respective spring portions undergoes the effect of resonance. Therefore, the substrate can be always electrically connected to the terminal by the other spring portion which does not undergo the effect of resonance and hence even when the pressure sensor undergoes vibrations from the outside, the pressure sensor can always output a signal.

Moreover, since one end portions of the respective spring portions are fixed to the substrate, even when the pressure sensor undergoes external vibrations, the other end portions of the respective spring portions resonate with external vibrations of different frequencies, so that the other end portions of the spring portions are different from each other in the state of rubbing the substrate. Therefore, the respective spring portions and the substrate are different from each other in the progress of wear and the progress of wear has redundancy. Accordingly, it is possible to reduce wear in the respective spring portions and the substrate.

In the above described examples of the present invention, the one end portions of the spring portions can continuously extend on the substrate or the terminal in an extending direction. In this case, the other end portions of the spring portions can be separated from each other on the terminal or the substrate in a direction parallel to the extending direction to contact the terminal of the substrate at plural positions. Further, the spring portions can have shapes different from each other. Furthermore, the spring portions can be formed in the shape of a letter V that is constructed at the one end and the other end portion.

BRIEF DESCRIPTION OF THE DRAWINGS

The above and other objects, features and advantages of the present invention will become more apparent from the following detailed description of preferred embodiments made with reference to the accompanying drawings, in which:

FIGS. 2A and 2B are schematic views of a spring terminal in the first embodiment, in which

FIGS. 3A and 3B are schematic views of a spring terminal in a second embodiment of the present invention, in which

DETAILED DESCRIPTION OF PREFERRED EMBODIMENTS (First Embodiment)

Hereafter, the first embodiment of the present invention will be described with reference to the accompanying drawings. A pressure sensor described in this embodiment is used in a place where the pressure sensor suffers vibrations of several kHz, for example, in an engine room of a vehicle, and the like.

Figure 1:
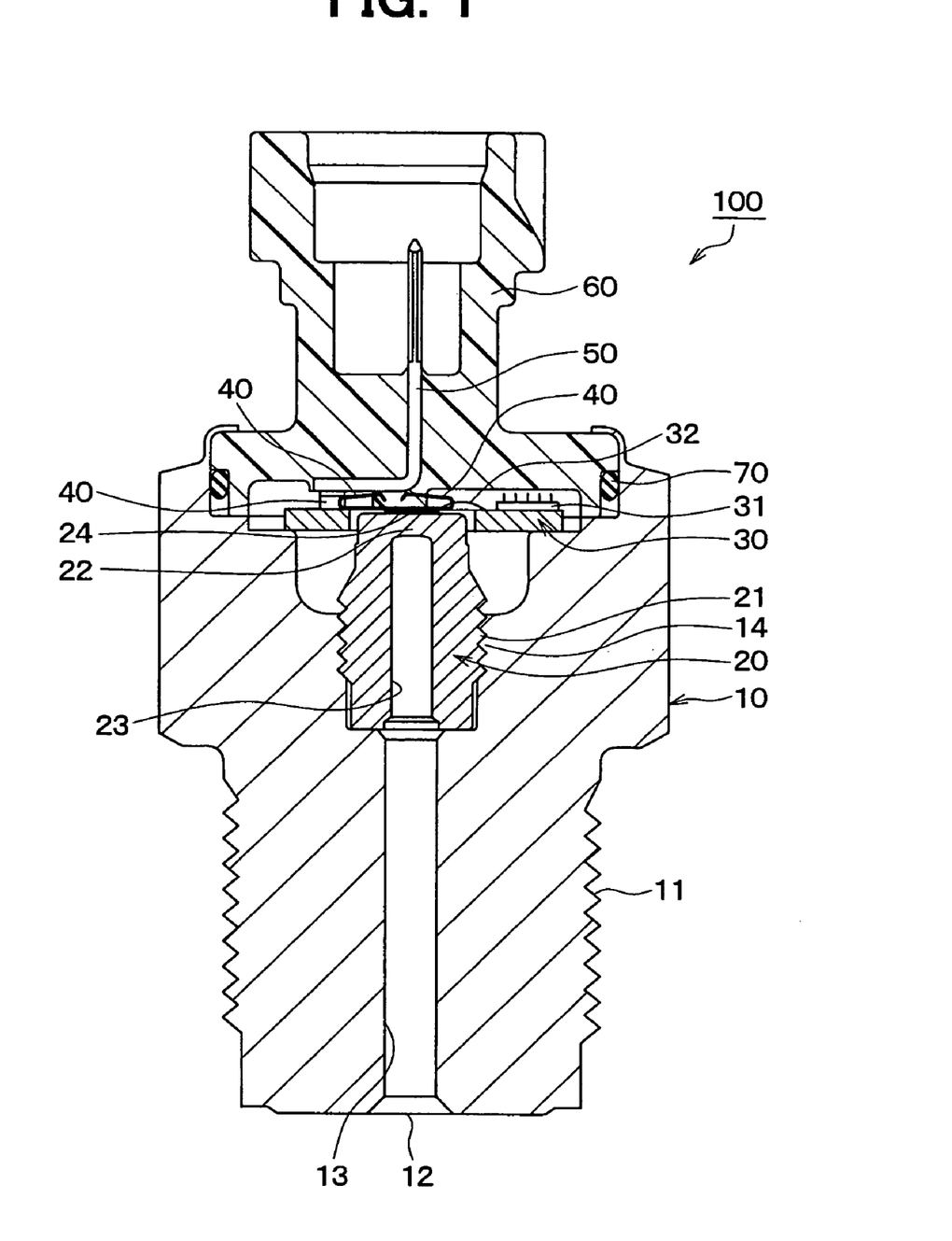
FIG. 1 is a schematic sectional view of a pressure sensor in accordance with a first embodiment of the present invention.

FIG. 1 is a schematic sectional view of a pressure sensor 100 in the first embodiment. As shown in this drawing, the pressure sensor 100 is so constructed as to include a housing 10, a stem 20, a substrate 30, a spring terminal 40, a terminal 50, and a connector case 60.

The housing 10 is a hollow case made of metal and worked by cutting, cold forging, or the like, and has a threaded portion 11, which can be connected to a body to be measured by screw coupling. The threaded portion 11 is formed on the outer peripheral surface of one end side of the housing 10. A hole extending from an opening 12 formed in one end of the housing 10 to the other end of the housing 10, that is, a pressure introducing hole 13 is formed in the housing 10 and this pressure introducing hole 13 is used as a pressure introducing passage.

The stem 20 is a part made of metal and formed in the shape of a hollow cylinder and has a male threaded portion 21, which is formed on the outer peripheral portion of the stem 20 to be screwed into a female threaded portion 14 formed on the pressure introducing hole 13 of the housing 10, thereby being received in the housing 10. This stem 20 has a thin diaphragm part 22, which can be deformed by pressure introduced into the housing 10, at one end of its axis and has a passage 23, which communicates with the diaphragm part 22, on the other end thereof. The passage 23 and the pressure introducing hole 13 of the housing 10 are brought to the state of communication, thereby the pressure of a body to be measured is transmitted from the pressure introducing hole 13 to the diaphragm part 22.

Moreover, a sensor chip 24, which is made of single crystal Si (silicon) and is used for sensing pressure, is fixed on the diaphragm part 22 of this stem 20. This sensor chip 24 has an integrated circuit, and when the diaphragm part 22 is deformed by the pressure introduced into the stem 20, the sensor chip 24 functions as a sensing part (strain gauge) that converts a change in resistance responsive to its deformation to an electric signal and outputs the electric signal.

Specifically, when the diaphragm part 22 is deformed by the pressure introduced into the stem 20, the strain gauge on the sensor chip 24 placed on the diaphragm part 22 is deformed according to the deformation. At this time, the resistance of the strain gauge is changed by a piezoelectric resistance effect produced by this deformation. Therefore, by sensing a change in this resistance, pressure applied to the strain gauge, that is, pressure introduced into the stem 20 can be sensed. Then, the sensor chip 24 produces an electric signal responsive to the pressure transmitted to the diaphragm part 22. This has an effect on the basic performance of a pressure sensor 100.

The substrate 30 has an IC chip 31 having a function for converting a signal sensed by the sensor chip 24 to a signal for outputting it to the outside, a circuit for processing the signal, and a wiring pattern. Specifically, the sensor chip 24 and the substrate 30 are bonded and electrically connected to each other by a wire 32, thereby the signal of the sensor chip 24 is inputted to the circuit and the IC chip 31 arranged on the substrate 30. This substrate 30 is in a state where it is placed on the housing 10 receiving the stem 20, by an adhesive or the like.

The spring terminal 40 is for electrically connecting the circuit in the substrate 30 to the terminal 50 and is formed of a metal plate both sides of which are bent into the form of a spring. Moreover, this spring terminal 40 is formed of, for example, phosphor bronze, beryllium copper, titan copper, stainless steel, or the like and is directly bonded to a position where the electrode of the substrate 30 is arranged by a conductive adhesive. A portion used as the spring of the spring terminal 40 is made to abut against the terminal 50, thereby the substrate 30 can be electrically connected to the terminal 50.

Moreover, since the number of terminals 50 used for the pressure sensor 100 of this embodiment is three, as will be described later, three spring terminals 40 are placed on the substrate 30. Each of the spring terminals 40 is electrically connected to each of the terminals 50.

The terminal 50 is constructed of a bar-shaped part formed in the shape a letter L and is placed in the connector case 60. Moreover, the bottom portion 51 of the terminal 50 is formed in a flat shape (see FIG. 2A, which will be described later) and a portion used as the spring of the above-described spring terminal 40 is adapted to abut against this bottom portion 51. In this embodiment, three terminals 50 for power supply for operating the pressure sensor 100, for grounding, and for outputting a signal are placed in the connector case 60. The tip portions of the terminals 50 are connected to external connectors (not shown) and are electrically connected via wiring parts to the other circuit and the like outside the pressure sensor 100.

The connector case 60 is a connector for outputting the signal of a pressure value sensed by the pressure sensor 100 and is formed of resin or the like. The other end of the housing 10 is fixed in such a way as to press this connector case 60 in a state where the connector case 60 is fitted in the other end of the housing 10 via an O-ring 70. With this, the connector case 60 is integrated with the housing 10 to construct a package to protect the sensor chip 24, the substrate 30, the electric connections and the like, arranged in the package, from moisture and mechanical external force.

Figure 2A:
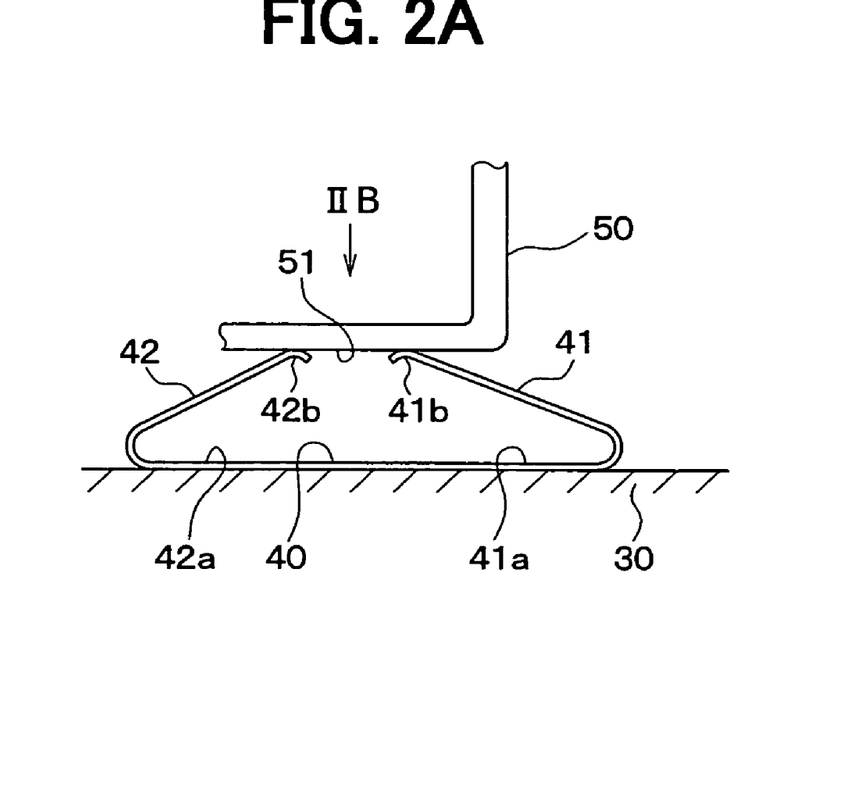
FIG. 2A is a schematic view of the vicinity of the spring terminal and FIG. 2B is a view when viewed from arrow IIB in FIG. 2A.
Figure 2B:
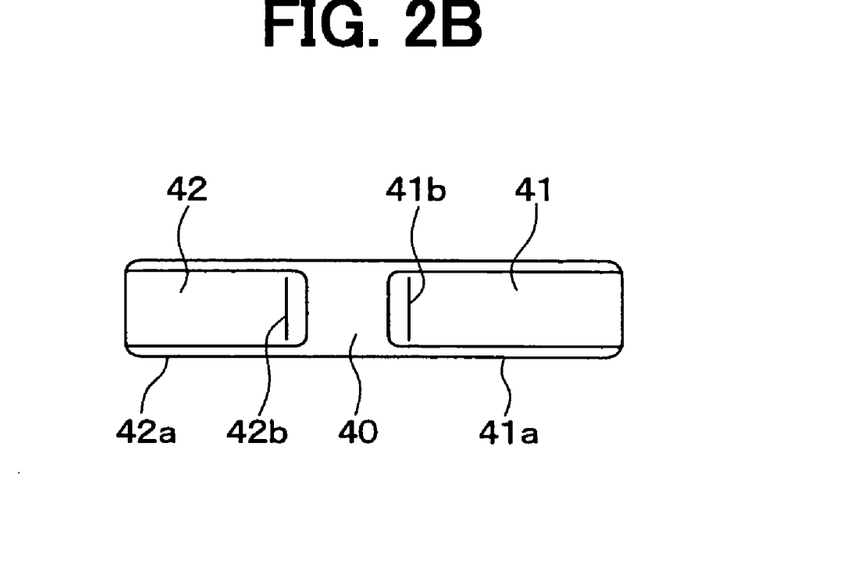

Next, the above-described spring terminal 40 will be described with reference to FIGS. 2A and 2B. FIGS. 2A and 2B are schematic views of the spring terminal 40 used in this embodiment. FIG. 2A is a schematic view of the vicinity of the spring terminal 40, and FIG. 2B is a view when viewed from arrow IIB in FIG. 2A.

As described above, the spring terminal 40 is constructed of a single metal plate. Specifically, the spring terminal 40 has a structure in which both sides of the metal plate are bent to form a plurality of plate spring portions, that is, two spring portions 41, 42. Each of the spring portions 41, 42 is provided with one end portion 41a and the other end portion 41b, or one end portion 42a and the other end portion 42b, in the shape of a letter V. In this embodiment, as shown in FIG. 2A, since the bent portions on both end sides of the metal plate are different from each other in length, one of the spring portions 41, 42 is more easily bent than the other. Then, one end portions 41a, 42a of the spring portions 41, 42 are bonded to the substrate 30.

In this embodiment, the metal plate constructing the spring terminal 40 has a thickness of 0.08 mm. Moreover, the metal plate has a width of 1.2 mm but each of the bent portions on both end sides of the metal plate has a width of 1.0 mm. It is because a bonding area to the substrate 30 is enlarged to fix the spring terminal 40 to the substrate 30 with reliability that, as described above, in the metal plate, a portion bonded to the substrate is made larger in width than a portion forming the spring.

Moreover, one of the bent portions on both end sides of the metal plate has a length of, for example, 2.5 mm and the other portion has a length of 5.0 mm. Since the bent portions on both end sides of the metal plate are different from each other in length, the respective spring portions 41, 42 are different from each other in the natural frequency.

In the spring terminal 40 having the construction like this, as shown in FIG. 2B, when the spring terminal 40, that is, the other end portions 41b, 42b of the respective spring portions 41, 42 are pressed in the direction of the substrate 30 by the terminal 50, the other end portions 41b, 42b of the respective spring portions 41, 42 are made to abut against the terminal 50. In short, when the respective spring portions 41, 42 are pressed by the terminal 50, the other end portions 41b, 42b of the respective spring portions 41, 42 are brought into tightly contact with the bottom portion 51 of the terminal 50 by the restoring forces of the respective spring portions 41, 42, thereby the spring terminal 40 can be electrically connected to the terminal 50.

In the pressure sensor 100 having the construction described above, the diaphragm part 22 is strained by the pressure introduced from the pressure introducing hole 13, so that an electric signal showing resistance responsive to its strain is outputted to the substrate 30. Then, this electric signal is converted to an output signal by the circuit in the substrate 30 and this output signal is outputted from the circuit in the substrate 30 via the spring terminal 40 to the terminal 50, thereby the pressure is sensed.

When mechanical vibrations are applied to the pressure sensor 100 like this, the spring portions 41, 42 of the spring terminal 40 might resonate with the mechanical vibrations. Resonance develops when the frequencies of mechanical vibrations are nearly equal to the natural frequency of the spring portion. However, since the spring terminal 40 is provided with two spring portions 41, 42 which are different from each other in a natural frequency, even if one of the spring portions 41, 42 resonates with the mechanical vibrations, the other spring portion does not resonate with the mechanical vibrations. Hence, even when the mechanical vibrations are applied to the pressure sensor 100, the electric connection between the circuit in the substrate 30 and the terminal 50 can be kept and hence the pressure sensor 100 can output a stable signal.

The electric connection between the circuit in the substrate 30 and the terminal 50 is formed via the spring terminal 40 having two spring portions 41, 42 which are different from each other in a natural frequency. Accordingly, when the pressure sensor 100 receives external vibrations, even if one of the two spring portions 41, 42 might resonate with the external vibrations, the other spring portion does not resonate with the external vibrations. Therefore, the circuit in the substrate 30 and the terminal 50 can be electrically connected to each other with reliability. With this, it is possible to enhance the resistance to vibration of the pressure sensor 100 and hence for the pressure sensor 100 to output a stable signal.

Moreover, in the spring terminal 40, the widths of one end portions 41a, 42a of the respective spring portions 41, 42 are larger than those of the other end portions 41b, 42b to enlarge the bonding area to the substrate 30. Accordingly, even when the pressure sensor 100 receives the external vibrations, the spring portions 41, 42 do not vibrate with respect to the surface of the substrate 30. For this reason, even when the other end portions 41b, 42b of the respective spring portions 41, 42 vibrate, the other end portions 41b, 42b of the respective spring portions 41, 42 do not rub the terminal 50. Therefore, it is possible to prevent wear on the spring portions 41, 42 and the terminal 50.

(Second Embodiment)

In this embodiment, only portions different from the first embodiment will be described. This embodiment is different from the first embodiment in that the spring terminal 40 is bonded to the terminal 50.

Figure 3A:
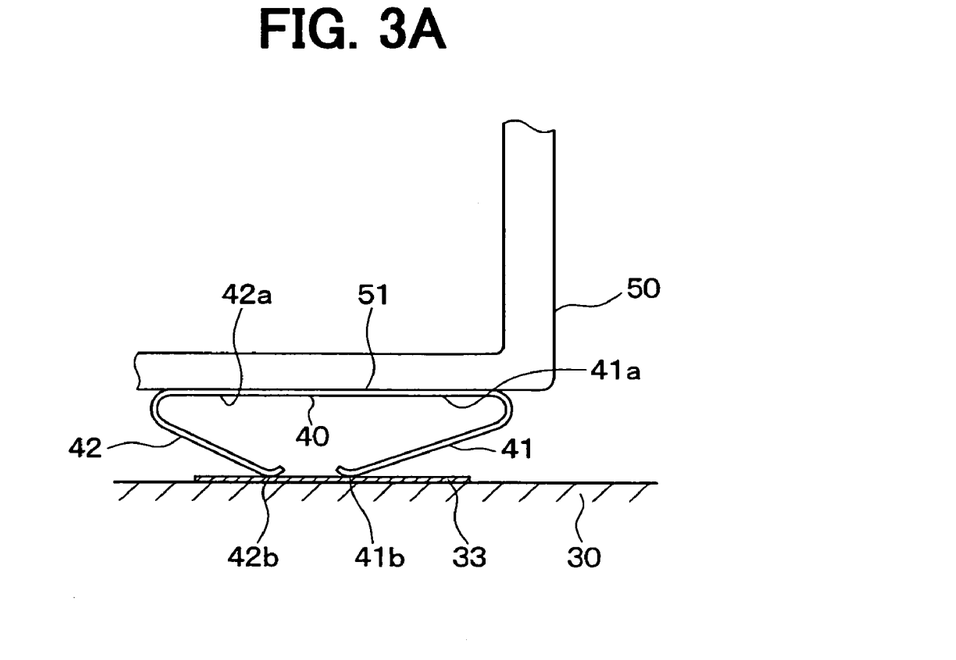
FIG. 3A is a schematic view of the vicinity of the spring terminal and FIG. 3B is a view of a substrate when viewed from a connector case side.
Figure 3B:
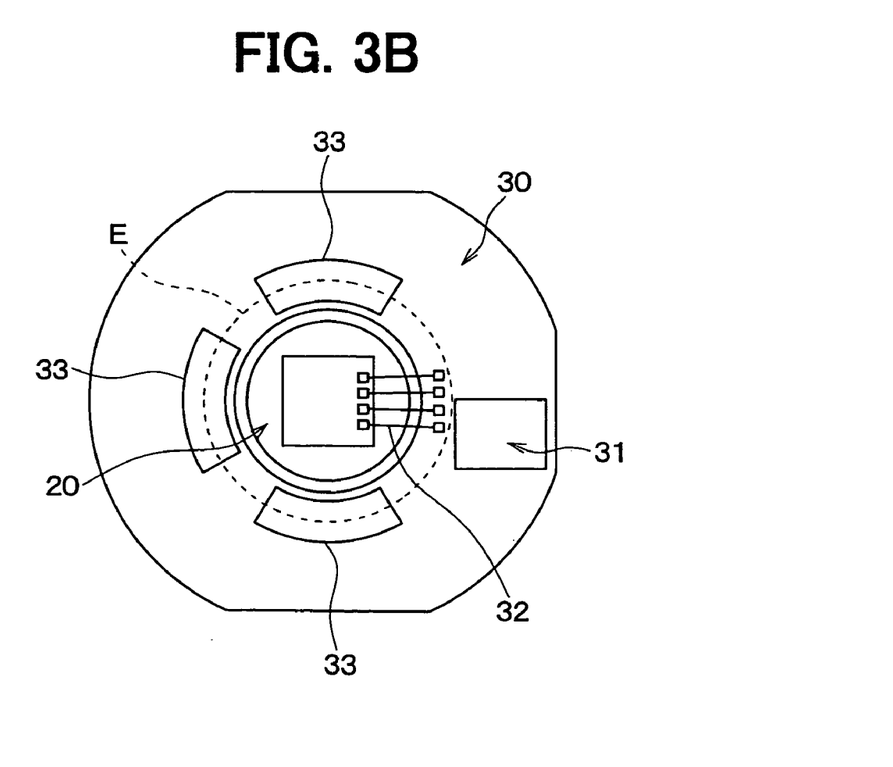

FIGS. 3A and 3B are schematic views of the spring terminal 40 in this embodiment, in which FIG. 3A is a schematic view of the vicinity of the spring terminal 40 and FIG. 3B is a view of the substrate 30 when viewed from the connector contact 60 side.

As shown in FIG. 3A, the spring terminal 40 is in the state where it is bonded to the bottom portion 51 of the terminal 50. The spring terminal 40 is bonded to the bottom portion 51 of the terminal 50, for example, by resistance welding. Here, as to the spring terminal 40 used in this embodiment, the same part as in the first embodiment is employed.

Moreover, as shown in FIG. 3B, the substrate 30 has electrodes 33 arranged thereon in such a way that the electrodes 33 are electrically connected via the spring terminal 40 to the terminal 50. Each of the electrodes 33 is formed in a shape extending in the peripheral direction of a circle E, which has an arbitrary radius with its center at the central axis of assembling the housing 10 with the connector case 60, that is, in the shape of a fan. The other end portions 41b, 42b of the respective spring portions 41, 42 of the spring terminal 40 abut against these electrodes 33 each formed in the shape of a fan, so that the circuit in the substrate 30 is electrically connected to the terminal 50.

In this manner, as in the first embodiment, because the circuit in the substrate 30 is electrically connected to the terminal 50 by the plurality of spring portions 41, 42, which are different from each other in the natural frequency, it is possible to enhance the resistance to external vibration of the pressure sensor 100.

Moreover, each of the electrodes 33 is formed in the shape of a fan. Accordingly, even when the connector case 60 rotates with respect to the central axis of assembling, the other end portions 41b, 42b of the respective spring portions 41, 42 of the spring terminal 40 bonded to the terminal 50 move along the electrodes 33 because the electrodes 33 are formed in the shape along the direction of rotation. Thus, assembling allowance can be enlarged until the other end portions 41b, 42b of the respective spring portions 41, 42 go out of the electrodes 33. Hence, the other end portions 41b, 42b of the respective spring portions 41, 42 can be always put into contact with the fan-shaped wide electrodes 33 placed on the substrate 30 and hence the pressure sensor 100 can output a signal with reliability.

Since the one end portions 41a, 42a of the respective spring portions 41, 42 are in the state where they are bonded to the terminal 50, even when the pressure sensor 100 receives external vibrations, the spring portions 41, 42 resonate with external vibrations of different frequencies and hence are different in the progress of wear and the progress of wear has redundancy. Thus, it is possible to prevent wear of the spring terminal 40 and the electrodes 33.

In addition, when the housing 10 is connected with the connector case 60, other end portions 41b, 42b of the respective spring portions 41, 42 can be reliably put into contact with the electrodes 33. Accordingly, it is possible to prevent a reduction in production yield of the pressure sensor 100 and to enhance the reliability of the pressure sensor 100.

(Third Embodiment)

In this embodiment, only portions different from the first embodiment and the second embodiment will be described. In the above first and second embodiments, the spring terminal 40 in which the respective spring portions 41, 42 have different natural frequencies is employed. However, in this embodiment, a spring terminal in which the respective spring portions have the same natural frequency characteristic is used and this spring terminal is changed in the state of arrangement, so that the frequencies, at which the respective spring portions resonate with the external vibrations, are set different from each other. Hereafter, this will be described with reference to FIG. 4.

Figure 4:
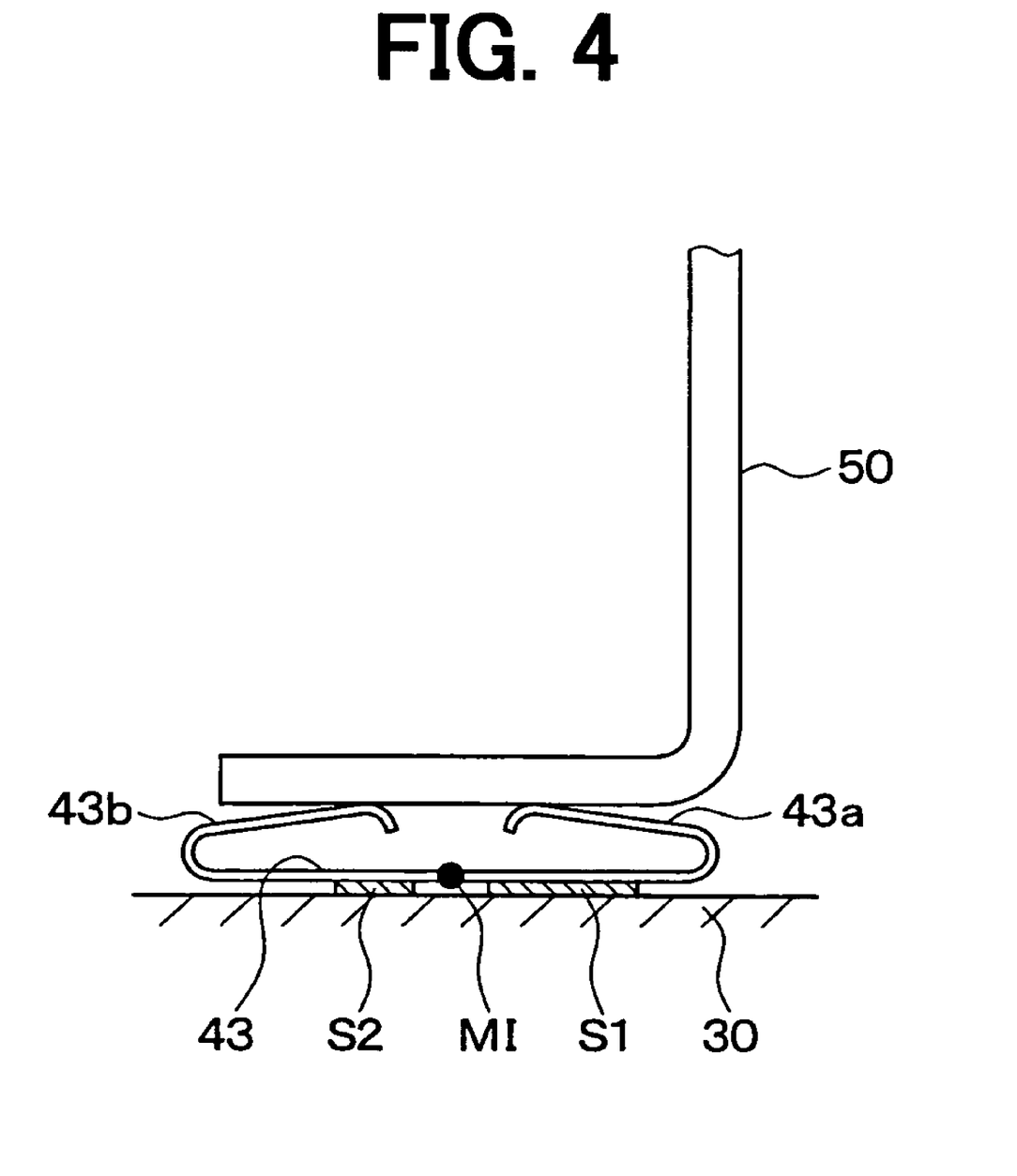
FIG. 4 is a schematic view of the vicinity of a spring terminal in a third embodiment of the present invention.

FIG. 4 is a schematic view of the vicinity of a spring terminal 43 in accordance with this embodiment. First, in this embodiment, the spring terminal 43 is constructed of a single metal plate and has a structure in which both sides of the metal plate are bent to form a plurality of, that is, two spring portions 43a, 43b. Moreover, the bent portions on both end sides of the metal plate are made equal to each other in length and the respective spring portions 43a, 43b have the same natural frequency. For this reason, the respective spring portions 43a, 43b resonate at the same natural frequency. The spring terminal 43 like this is bonded to the substrate 30 by solders S1, S2. In the spring terminal 43, the thickness of the metal plate is, for example, 0.08 mm and the width of the metal plate is, for example, 1.2 mm.

As shown in FIG. 4, these solders S1, S2 are different from each other in length in a longitudinal direction of the spring terminal 43. Specifically, assuming that a middle point in the longitudinal direction in such a portion of the spring terminal 43 that is opposite to the surface of the substrate 30 is M1, the respective ends on the spring portion sides of the respective solders S1, S2 are at positions asymmetric with respect to the middle point M1.

By arranging the solders S1, S2 in this manner, in the respective spring portions 43a, 43b, respective portions from the respective ends on the respective spring portion sides of the respective solders S1, S2 function as plate springs. That is, the positions functioning as the plate springs are different between the respective spring portions 43a, 43b, and hence the respective spring portions 43a, 43b are different from each other in a bent shape. Therefore, frequencies at which the respective spring portions 43a, 43b resonate with vibrations applied to the pressure sensor 100 are different between the respective spring portions 43a, 43b. Thus, by placing the spring terminal 43, which is provided with the respective spring portions 43a, 43b having the same natural frequency characteristic, on the substrate 30 on the basis of arrangement of the solders S1, S2 shown in FIG. 4, the frequencies at which the respective spring portions 43a, 43b resonate can be changed to different frequencies, respectively.

As described above, in this embodiment, the spring portions 43a, 43b having the same natural frequency characteristic are placed between the substrate 30 and the terminal 50 in such a way as to be different from each other in the bent shape. With this, it is possible to make the frequencies, at which the respective spring portions 43a, 43b resonate, different from each other. Hence, even when the pressure sensor 100 receives external vibrations and one of the respective spring portions 43a, 43b resonates with the external vibrations, the other spring portion does not resonate with the external vibrations, so that the electric connection between the substrate 30 and the terminal 50 can be always kept. In this manner, it is possible to enhance the resistance to vibration of the pressure sensor 100 and hence for the pressure sensor 100 to output a signal with reliability.

In addition, since one end portions of the respective spring portions 43a, 43b are fixed to the substrate 30, even when the pressure sensor 100 receives external vibrations, the other end portions of the respective spring portions 43a, 43b resonate with the external vibrations of different frequencies, so that the other end portions of the respective spring portions 43a, 43b are different from each other in the state where they rub the substrate 30. Hence, the respective spring portions 43a, 43b and the substrate 30 are different from each other in the degree of progress of wear and the progress of wear has redundancy. Therefore, it is possible to reduce wear of the respective spring portions 43a, 43b and the substrate 30.

(Fourth Embodiment)

In this embodiment, only portions different from the first to the third embodiments will be described. In the above third embodiment, the spring terminal 43 is placed on the substrate 30 via the solders S1, S2. However, similarly to the second embodiment, the spring terminal 43 may be bonded to the bottom portion of the terminal 50 in the above third embodiment. In this case, as in the third embodiment, the spring terminal 43 may be bonded via the solders S1, S2 to the bottom portion 51 of the terminal 50. In short, when one end portions of the respective spring portions 43a, 43b are bonded to the bottom portion 51 of the terminal 50, the respective spring portions 43a, 43b are placed in different bent shapes between the terminal 50 and the substrate 30. In this embodiment, the same one as the spring terminal 43 used in the third embodiment is employed.

Hence, the spring terminal 43 shown in FIG. 4 can be bonded to the bottom portion 51 of the terminal 50, similarly to the second embodiment. In this case, the terminal 50 employed in the second embodiment is used.

Moreover, in the second embodiment, the substrate 30 has the fan-shaped electrodes 33 arranged thereon (see FIG. 3B) and the other end portions of the spring portions 43a, 43b of the spring terminal 43 abut against these fan-shaped electrodes 33 to electrically connect the circuit in the substrate 30 to the terminal 50.

As described above up to this point, the spring terminal 43 having the same natural frequency characteristic is bonded via the solders S1, S2 to the bottom portions 51 of the terminal 50 and the spring portions 43a, 43b are made different from each other in the bent shape. With this, the frequencies at which the respective spring portions 43a, 43b resonate are different from each other. Therefore, even when the pressure sensor 100 has external vibrations applied thereto, the electric connection between the circuit in the substrate 30 and the terminal 50 can be always kept by one of the spring portions 43a, 43b that is not affected by the effect of resonance. Hence, it is possible to enhance the resistance to external vibration of the pressure sensor 100.

In addition, since the one end portions of the spring portions 43a, 43b are fixed to the terminal 50, even when the pressure sensor 100 undergoes external vibrations, the other end portions of the spring portions 43a, 43b resonate with the external vibrations of different frequencies. Hence, the other end portions of the spring portions 43a, 43b are different from each other in the state where they rub the substrate 30 and hence the spring portions 43a, 43b and the substrate 30 are different from one another in the progress of wear and the progress of wear has redundancy. Therefore, it is possible to reduce wear of the spring portions 43a, 43b and the substrate 30.

Other Embodiments

Although the present invention has been described in connection with some preferred embodiments thereof with reference to the accompanying drawings, it is to be noted that various changes and modifications will become apparent to those skilled in the art.

For example, in the first and the second embodiments, the spring portions 41, 42 on both sides of the metal plate in the spring terminal 40 are bent in different lengths to make their natural frequencies different from each other, but this is only one example. That is, the natural frequencies of the respective spring portions 41, 42 can be made different from each other also by other methods. Hereafter, examples of the spring terminal are shown in FIGS. 5A–5C and FIG. 6A–6C. Here, FIGS. 6A to 6C are views of the spring terminals 82, 83 when viewed from the terminal 50 side.

Figure 5A:
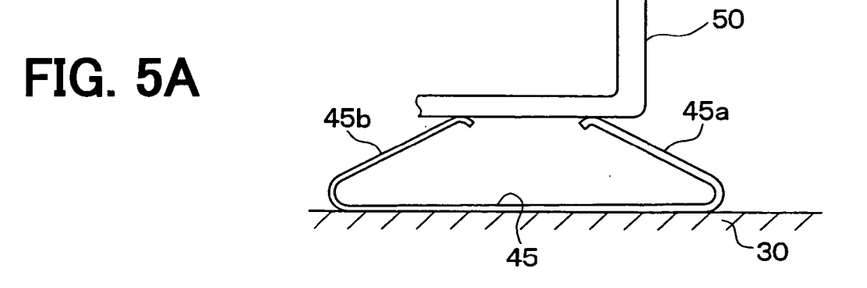
FIG. 5A is a schematic view showing an example of a spring terminal in the first embodiment, FIG. 5B a schematic view showing another example of a spring terminal in the first embodiment.
Figure 6A:
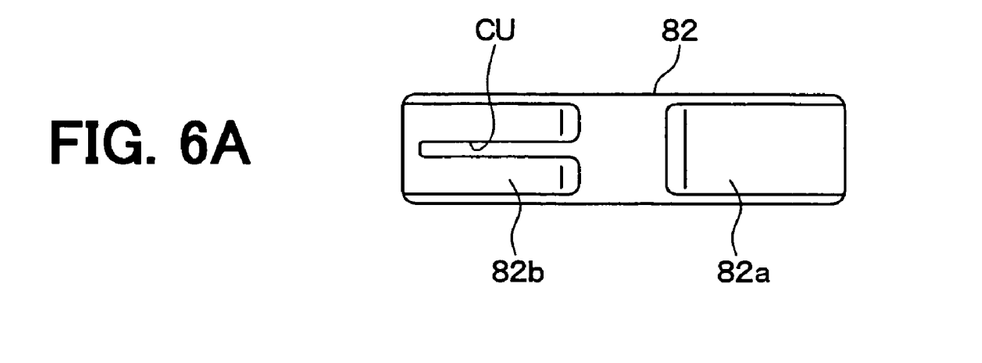
FIGS. 6A, 6B and 6C are views showing examples of the spring terminal in the first embodiment.
Figure 6B:
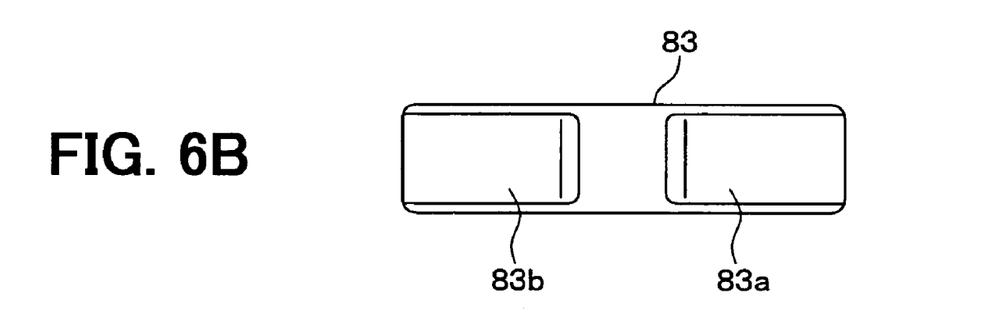
Figure 6C:
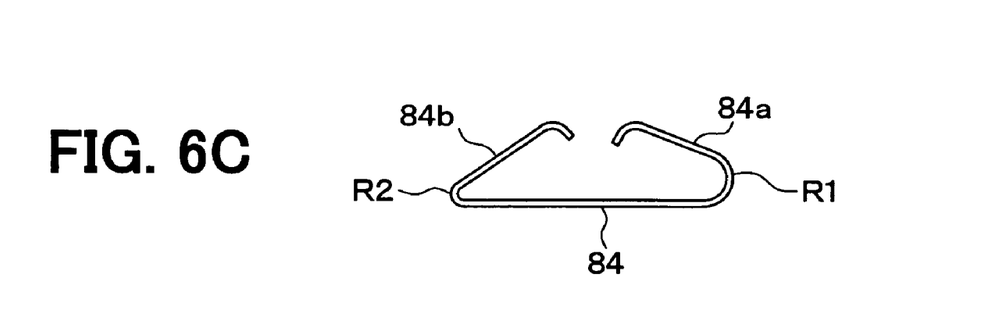

FIG. 5A is a view showing a spring terminal 45 in which the respective spring portions 45a, 45b are different from each other in thickness. In this manner, by making the respective spring portions 45a, 45b different from each other in thickness, the respective spring portions 45a, 45b can be made different from each other in the natural frequency.

Figure 5B:
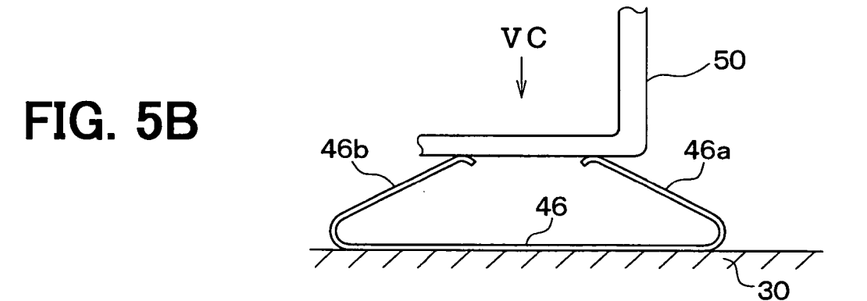
Figure 5C:
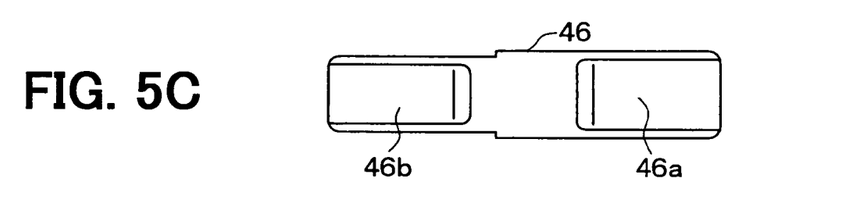
FIG. 5C is a view when viewed from arrow VC in FIG. 5B, FIG. 5D a schematic view showing further another example of a spring terminal in the first embodiment.

FIG. 5B and FIG. 5C are views showing a spring terminal 46 in which the respective spring portions 46a, 46b are different from each other in width. In this manner, it is also recommendable to provide the respective spring portions 46a, 46b which are different from each other in width.

Figure 5D:
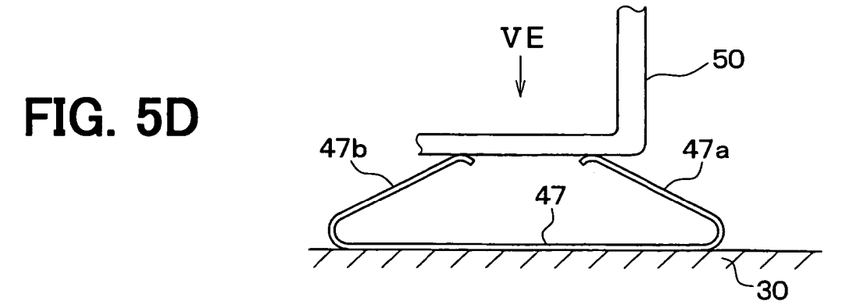
Figure 5E:
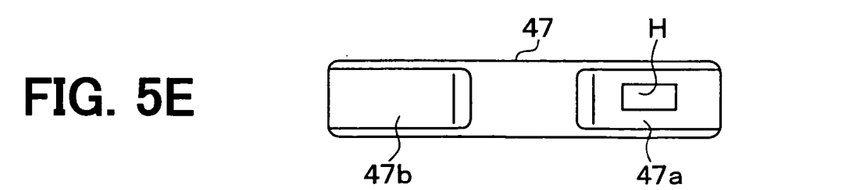
FIG. 5E is a view when viewed from arrow VE in FIG. 5D.

Further, FIG. 5D and FIG. 5E are views showing a spring terminal 47 having two spring portions 47a, 47b, in which the spring portion 47a has a hole H formed therein. In this manner, by forming the hole H in one of the two spring portions 47a, 47b, it is possible to make the respective spring portions 47a, 47b different from each other in weight and hence to make the respective spring portions 47a, 47b different from each other in the natural frequency.

Still further, FIG. 6A is a view of a spring terminal 82 in which the shape of one spring portion 82b is different from the shape of the other spring portion 82a. As shown in FIG. 6A, the spring portion 82b has a deep groove CU formed therein. This groove CU can make the natural frequencies of the respective spring portions 82a, 82b different from each other. Here, the groove CU is not limited to the one shown in FIG. 6A. For example, the widths of the metal plates on the left and right sides of the groove CU may be different from each other and the groove CU may be made shallow.

FIG. 6B is a view showing a spring terminal 83 in which respective spring portions 83a, 83b are constructed of metal plates of different materials. In general, the natural frequency of a metal plate is changed by a change in elasticity (modulus of elasticity) and in density. The example shown in FIG. 6B uses this property. That is, one portion of the respective spring portions 83a, 83b is formed of, for example, phosphor bronze and the other portion is formed of, for example, beryllium copper. Then, these portions are connected to the ends of the metal plate to construct the spring terminal 83. In this manner, by forming the respective spring portions 83a, 83b of different materials, the natural frequencies of the spring portions 83a, 83b can be made different from each other.

The respective spring portions 83a, 83b of the spring terminal 83 shown in FIG. 6B can be constructed of the same material. In this case, by constructing the respective spring portions 83a, 83b of materials of different grades, that is, materials different in modulus of elasticity, the natural frequencies of the respective spring portions 83a, 83b can be made different from each other.

FIG. 6C is a view showing a spring terminal 84 in which the spring portions of respective spring portions 84a, 84b are different from each other in curvature. As shown in FIG. 6C, the radius of curvature R1 of one spring portion 84a is different from the curvature R2 of the other spring portion 84b. With this, the natural frequencies of the respective spring portions 84a, 84b can be made different from each other.

Still further, the spring terminals 40, 45 to 47, 82 to 84 shown in FIG. 2A, FIG. 3A, FIGS. 5A–5E, and FIGS. 6A–6C employ a structure in which both sides of one metal plate are bent, but the structures of the spring terminals 40, 45 to 47, 82 to 84 are not limited to this structure. That is, it may be possible to prepare two (or a plurality of) spring portions which are different from each other in natural frequency. For example, the simple spring portions 41, 42 of the spring terminal 40, which are separate from each other, may be bond to the substrate 30, respectively. When the circuit in the substrate 30 is electrically connected to the terminal 50 via the spring portions which are different from each other in the natural frequency in this manner, even if the pressure sensor 100 undergoes vibrations from the outside, the spring portion which does not resonate with the vibrations can keep the electric connection between the substrate 30 and the terminal 50. Similarly, in the spring terminal 43 shown in FIG. 4, the respective spring portions 43a, 43b which are separated from each other may be used.

In the respective spring terminals 40, 45 to 47 described above, there is provided a structure in which both sides of the metal plate are bent, but the spring terminal may be formed in a shape in which both sides of the metal plate are curved. Even if the spring portions are formed in the curved structure like this, if the two curved portions are different from each other in the natural frequency, they can produce the same effect as the spring terminals described above.

In the third embodiment, the solders S1, S2 bonded to the substrate 30 in the spring terminal 43 are changed in length and hence the respective spring portions 43a, 43b are changed in a bent shape, thereby the respective spring portions 43a, 43b are made different from each other in a resonance frequency. However, this is only one example. That is, the resonance frequencies of the respective spring portions 43a, 43b can be made different from each other also by other methods. Hereafter, examples of spring terminals are shown in FIGS. 7A–7D.

Figure 7A:
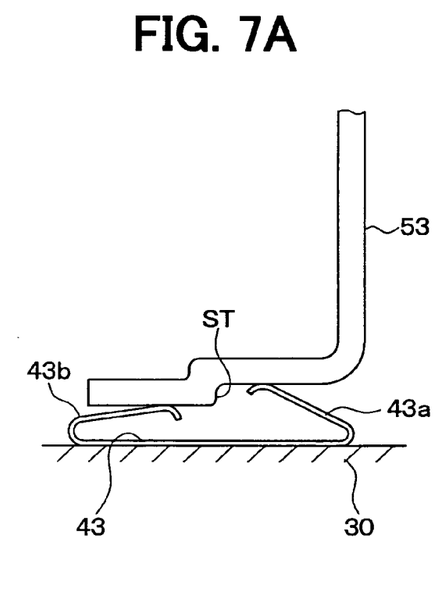
FIGS. 7A, 7B, 7C and 7D are views showing examples of the spring terminal in the third embodiment.

FIG. 7A is a view showing a state where the respective spring portions 43a, 43b of the spring terminal 43 abut against a terminal 53 having a step ST at the bottom portion of the terminal 53. As shown in FIG. 7A, the step ST is formed at the bottom portion of the terminal 53. When the respective spring portions 43a, 43b of the spring terminal 43 abut against the bottom portion of the terminal 53, the respective spring portions 43a, 43b are put into contact with the bottom portion at different heights by this step ST. With this, it is possible to make the respective spring portions 43a, 43b from each other in a bent shape and hence to make their resonance frequencies different from each other. The height of this step ST is, for example, from 0.1 mm to 1.0 mm.

Figure 7B:
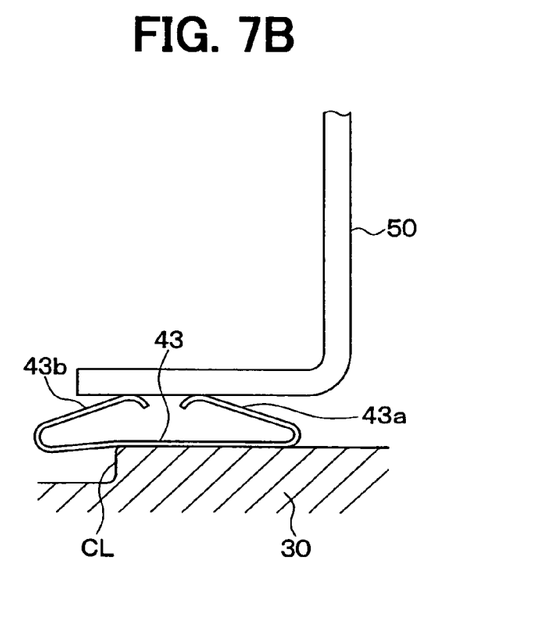

FIG. 7B is a view showing a state where a groove CL is formed on the spring portion 43 side of the respective spring portions 43a, 43b of the spring terminal 43. As shown in FIG. 7B, by cutting the substrate 30 on the spring portion 43b side to form the groove CL, the spring portion 43b is brought into a floating state. With this, it is possible to make the respective spring portions 43a, 43b from each other in a bent shape and hence to make the respective spring portions 43a, 43b resonate with different resonance frequencies. Here, this groove CL may be formed on the spring portion 43a side. Moreover, the groove CL is formed on the one side of the respective spring portions 43a, 43b, but it may be formed in any shape.

Figure 7C:
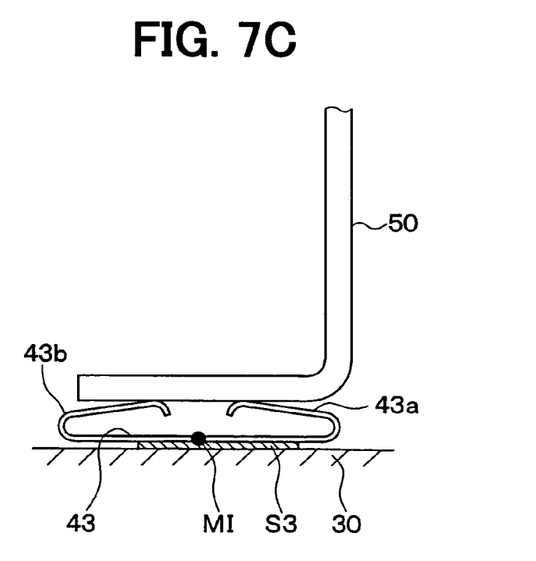

FIG. 7C is a view showing a state where the respective spring portions 43a, 43b of the spring terminal 43 abut against the bottom portion of the terminal 55. The bottom portion of the terminal 55 is bent to be inclined relative to the surface of the substrate 30. As shown in this drawing, the bottom portion of the terminal 55 is not parallel to the surface of the substrate 30 but is bent and slanted. That is, the respective spring portions 43a, 43b of the spring terminal 43 abut against the bottom portion of the terminal 55 at different heights. With this, the respective spring portions 43a, 43b are made different from each other in the bent shape and hence the respective spring portions 43a, 43b can be different from each other in the resonance frequency. When the bottom portion of the terminal 55 is bent in the slant relative to the substrate 30, the difference in height between the contact portions of the respective spring portions 43a, 43b are made, for example, approximately 0.05 mm.

Figure 7D:
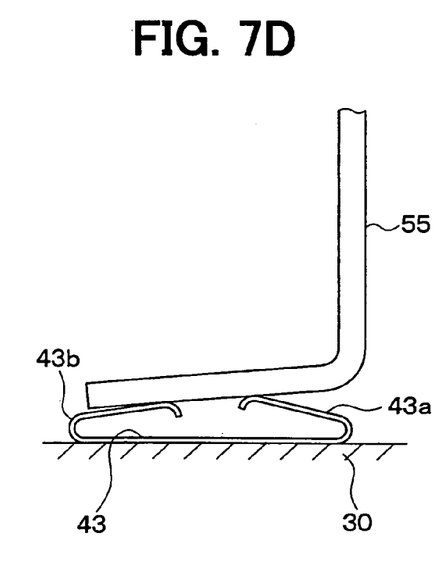

FIG. 7D is a view showing a state where the spring terminal 43 is bonded via solder S3 to the substrate 30. As shown in FIG. 7D, both ends of solder S3 are at asymmetric positions with respect to the middle point M1 of the spring terminal 43. With this, the respective spring portions 43a, 43b are made different from each other in the bent shape and hence the respective spring portions 43a, 43b can be different from each other in the resonance frequency.

Here, the solder S3 shown in FIG. 7D is the same as a case where the portion between the solders S1, S2 shown in FIG. 4 is filled with solder. In short, it is possible to conduct soldering in accordance with the circuit design of the substrate 30, as shown in FIG. 4 or FIG. 7D.

In the examples shown in FIG. 5A to FIG. 7, needless to say, like the second embodiment, the spring terminals 43, 45 to 47, 82 to 84 may be bonded to the bottom portion 51 of the terminal 50.

As described above, in the embodiments have been described, the spring terminals 40, 43, 45 to 47, 82 to 84 are used for a pressure sensor 100. However, the spring terminals 40, 43, 45 to 47, 82 to 84 can be used not only for the pressure sensor 100 described above but also for any place involving environment undergoing vibrations.

While the invention has been described with reference to preferred embodiments thereof, it is to be understood that the invention is not limited to the preferred embodiments and constructions. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. A pressure sensor comprising:
   a housing having a pressure introducing hole;
   a stem having a hollow cylindrical shape, which has a diaphragm part deformable by a pressure introduced into the housing at one end in an axis of the hollow cylindrical shape, and has a passage communicating with the pressure introducing hole at the other end of the axis;
   a sensing part that is provided on the diaphragm part and outputs an electric signal responsive to a deformation of the diaphragm part;

a substrate that receives the electric signal and makes an output signal responsive to the electric signal;

a spring terminal that has a plurality of spring portions which are different from each other in a natural frequency, wherein the spring portions have first end portions electrically connected to the substrate, and second end portions; and a terminal against which the second end portions of the spring portions abut and which outputs the output signal to an outside.

2. The pressure sensor according to claim 1, wherein the first end portions of the spring portions are bonded to the substrate.

3. The pressure sensor according to claim 1, wherein the first end portions continuously extend on the substrate in an extending direction.

4. The pressure sensor according to claim 3, wherein the second end portions are separated from each other on the terminal in a direction parallel to the extending direction to contact the terminal at plural positions.

5. The pressure sensor according to claim 1, wherein the spring portions have shapes different from each other.

6. The pressure sensor according to claim 1, wherein each of the spring portions has approximately a V shape.

7. The pressure sensor according to claim 1, further comprising a plurality of electrodes provided on the substrate, wherein the first end portions of the spring portions contact the electrodes provided on the substrate.

8. The pressure sensor according to claim 7, further comprising a connector case connected to the housing at a position opposite to a surface on which the stem is arranged in the housing, wherein the substrate is provided with the electrodes against which the first end portions of the spring portions abut, and each of the electrodes is formed in a fan shape extending in a circumferential direction of a circle having a center at a central axis of connecting the housing to the connector case and having a radius.

9. The pressure sensor according to claim 1, wherein the first end portions of the spring portions are bonded to the substrate using a solder.

10. The pressure sensor according to claim 1, wherein the first end portions of the spring portions are bonded to the substrate using solders, respectively, which have different bonding dimensions.

11. A pressure sensor comprising:

a housing having a pressure introducing hole;

a stem having a hollow cylindrical shape, which has a diaphragm part deformable by a pressure introduced into the housing at one end in an axial of the hollow cylindrical shape, and has a passage communicating with the pressure introducing hole at the other end of the axis;

a sensing part that is provided on the diaphragm part and outputs an electric signal responsive to a deformation of the diaphragm part;

a substrate that receives the electric signal and makes an output signal responsive to the electric signal;

a spring terminal that has a plurality of spring portions which are equal to each other in a natural frequency, wherein the spring portions have first end portions respectively electrically connected to the substrate, and second end portions; and a terminal to which the second end portions of the spring portions are bonded and which outputs the output signal to an outside, wherein the spring portions of the spring terminal have bent shapes that are different from each other.

12. The pressure sensor according to claim 11, further comprising a plurality of electrodes provided on the substrate, wherein the first end portions of the spring portions contact the electrodes provided on the substrate.

13. The pressure sensor according to claim 12, further comprising a connector case connected to the housing at a position opposite to a surface on which the stem is arranged in the housing, wherein the substrate is provided with the electrodes against which the first end portions of the spring portions abut, and each of the electrodes is formed in a fan shape extending in a circumferential direction of a circle having a center at a central axis of connecting the housing to the connector case and having a radius.

14. The pressure sensor according to claim 11, wherein the first end portions continuously extend on the substrate in an extending direction.

15. The pressure sensor according to claim 14, wherein the second end portions are separated from each other on the terminal in a direction parallel to the extending direction to contact the terminal at plural positions.

16. The pressure sensor according to claim 11, wherein the spring terminal including the spring portions is constructed with a single plate.

17. The pressure sensor according to claim 11, wherein each of the spring portions has approximately a V shape.

18. A pressure sensor comprising:

a housing having a pressure introducing hole;

a stem having a hollow cylindrical shape, which has a diaphragm part deformable by a pressure introduced into the housing at one end in an axis of the hollow cylindrical shape, and has a passage communicating with the pressure introducing hole at the other end of the axis;

a sensing part that is provided on the diaphragm part and outputs an electric signal responsive to a deformation of the diaphragm part;

a substrate that receives the electric signal and makes an output signal responsive to the electric signal;

a spring terminal that has a plurality of spring portions which are different from each other in a natural frequency;

a terminal which outputs the output signal to an outside; and a plurality of electrodes provided on the substrate, wherein the spring portions have first end portions bonded to the terminal, and second end portions abutting against electrodes of the substrate at different positions.

19. The pressure sensor according to claim 18, further comprising a connector case connected to the housing at a position opposite to a surface on which the stem is arranged in the housing, wherein the substrate is provided with the electrodes against which the first end portions of the spring portions abut, and each of the electrodes is formed in a fan shape extending in a circumferential direction of a circle having a center at a central axis of connecting the housing to the connector case and having a radius.

20. The pressure sensor according to claim 18, wherein the spring portions of the spring terminal have respectively bent shapes that are different from each other.

* * * * *